(12) United States Patent
Hailai et al.

(10) Patent No.: US 10,326,527 B2
(45) Date of Patent: Jun. 18, 2019

(54) METHODS OF REDUCING OR ELIMINATING INTERNAL OPTICAL LIGHT REFLECTIONS, INCREASING YIELD, REDUCING HIGH-TEMPERATURE TRANSMISSION FAILURES AND/OR IMPROVING OSA TRANSMISSION PERFORMANCE AND AN IMPROVED OPTICAL TRANSCEIVER IMPLEMENTING THE SAME

(71) Applicant: Source Photonics (Chengdu) Company, Ltd., Chengdu (CN)

(72) Inventors: Yongbu Hailai, Chengdu (CN); Ke Liu, Chengdu (CN); Xuanqi Zhang, Chengdu (CN); Yingjun Tian, Chengdu (CN)

(73) Assignee: SOURCE PHOTONICS (CHENGDU) CO., LTD., Chengdu (CN)

( * ) Notice: Subject to any disclaimer, the term of this patent is extended or adjusted under 35 U.S.C. 154(b) by 0 days.

(21) Appl. No.: 15/565,371

(22) PCT Filed: Sep. 29, 2017

(86) PCT No.: PCT/CN2017/104346
§ 371 (c)(1),
(2) Date: Oct. 9, 2017

(65) Prior Publication Data
US 2019/0103919 A1    Apr. 4, 2019

(51) Int. Cl.
*H04B 10/40* (2013.01)
*H04B 10/50* (2013.01)
(Continued)

(52) U.S. Cl.
CPC .......... *H04B 10/40* (2013.01); *G02B 6/4246* (2013.01); *G02B 6/4286* (2013.01); *H04B 10/25* (2013.01); *H04B 10/50* (2013.01); *H04B 10/60* (2013.01)

(58) Field of Classification Search
CPC ........ H04B 10/40; H04B 10/60; H04B 10/50; H04B 10/25; G02B 6/4246; G02B 6/4286
(Continued)

(56) References Cited

U.S. PATENT DOCUMENTS

| 2001/0007489 A1* | 7/2001 | Umemoto | ............ G02B 6/0061 349/113 |
| 2007/0240325 A1* | 10/2007 | Pelsue | ...................... B41M 5/24 33/707 |

(Continued)

FOREIGN PATENT DOCUMENTS

| CN | 2513127 Y | 9/2002 |
| CN | 1603873 A | 4/2005 |

(Continued)

OTHER PUBLICATIONS

International Search Report and Written Opinion; International Searching Authority/CN dated Jun. 22, 2018; International Application No. PCT/CN2017/104346; 9 pages; International Searching Authority/State Intellectual Property Office of the P.R. China; Beijing, China.

(Continued)

*Primary Examiner* — Juan A Torres
(74) *Attorney, Agent, or Firm* — Andrew D. Fortney; Central California IP Group, P.C.

(57) ABSTRACT

An optical transceiver and a method of making the same. The optical transceiver includes a base/housing having a roughened or darkened optics mounting surface, a transmitter optical subassembly (TOSA), a receiver optical subas-
(Continued)

sembly (ROSA), a beam splitter mount secured to or mounted on the roughened or darkened optics mounting surface, a beam splitter secured to or mounted on the beam splitter mount, and an optical fiber adapter. The TOSA includes a laser diode configured to convert a received electrical signal to an outgoing optical signal. The ROSA includes a photodiode configured to convert a received optical signal to an outgoing electrical signal. The beam splitter is transparent to one of the outgoing and received optical signals and is configured to reflect the other. The optical fiber adapter is configured to hold an optical fiber that receives the outgoing optical signal and provides the received optical signal.

20 Claims, 5 Drawing Sheets

(51) Int. Cl.
G02B 6/42 (2006.01)
H04B 10/25 (2013.01)
H04B 10/60 (2013.01)

(58) Field of Classification Search
USPC .......................................................... 398/117
See application file for complete search history.

(56) References Cited

U.S. PATENT DOCUMENTS

| 2007/0248357 | A1* | 10/2007 | Fediakine | H04B 10/564 |
| | | | | 398/27 |
| 2011/0091207 | A1* | 4/2011 | Xie | H04B 10/564 |
| | | | | 398/38 |
| 2011/0206327 | A1* | 8/2011 | Chen | G02B 6/4246 |
| | | | | 385/88 |
| 2011/0305454 | A1* | 12/2011 | Hsieh | H04B 10/40 |
| | | | | 398/38 |
| 2014/0355997 | A1* | 12/2014 | Miao | H04B 10/40 |
| | | | | 398/135 |
| 2015/0102802 | A1* | 4/2015 | Park | G01R 15/246 |
| | | | | 324/97 |

FOREIGN PATENT DOCUMENTS

| CN | 2766254 Y | 3/2006 |
| CN | 101340237 A | 1/2009 |
| CN | 201387500 Y | 1/2010 |
| CN | 102279445 A | 12/2011 |
| CN | 104363052 A * | 11/2014 |
| JP | 2007121987 A | 5/2007 |

OTHER PUBLICATIONS

Tsuyoshi Tanaka et al.; "Optical Transmission/Reception Module"; Bibliographic data of JP2007121987 (A); May 17, 2007; https://worldwide.espacenet.com.

Weiqiang He et al.; "Single-Fiber Bidirectional Double-Port Light Receiving and Transmitting Integral Component"; Bibliographic data of CN102279445 (A); Dec. 14, 2011; https://worldwide.espacenet.com.

Zhong Mingxing et al.; "Optical Mechanical Apparatus and Light Transmission Component Thereof"; Bibliographic data of CN101340237 (A); Jan. 7, 2009; https://worldwide.espacenet.com.

Guanghui Dong Zheng; "Novel Single-Fiber Bidirectional Device"; Bibliographic data of CN2766254 (Y); Mar. 22, 2006; https://worldwide.espacenet.com.

Du Xianpeng et al.; "GPON Single Fiber Bi-Directional Optical Transmitting-Receiving Component"; Bibliographic data of CN201387500 (Y); Jan. 20, 2010; https://worldwide.espacenet.com.

Bin Lin et al.; "Single Fibre Two-Way Receiving and Transmitting Module"; Bibliographic data of CN2513127 (Y); Sep. 25, 2002; https://worldwide.espacenet.com.

Xuequn Xu et al.; "Bidirectional Light Receiving-Transmitting Modular Structure Capable of Raising Optical Fiber Coupling Efficiency"; Bibliographic data of CN1603873 (A); Apr. 6, 2005; https://worldwide.espacenet.com.

* cited by examiner

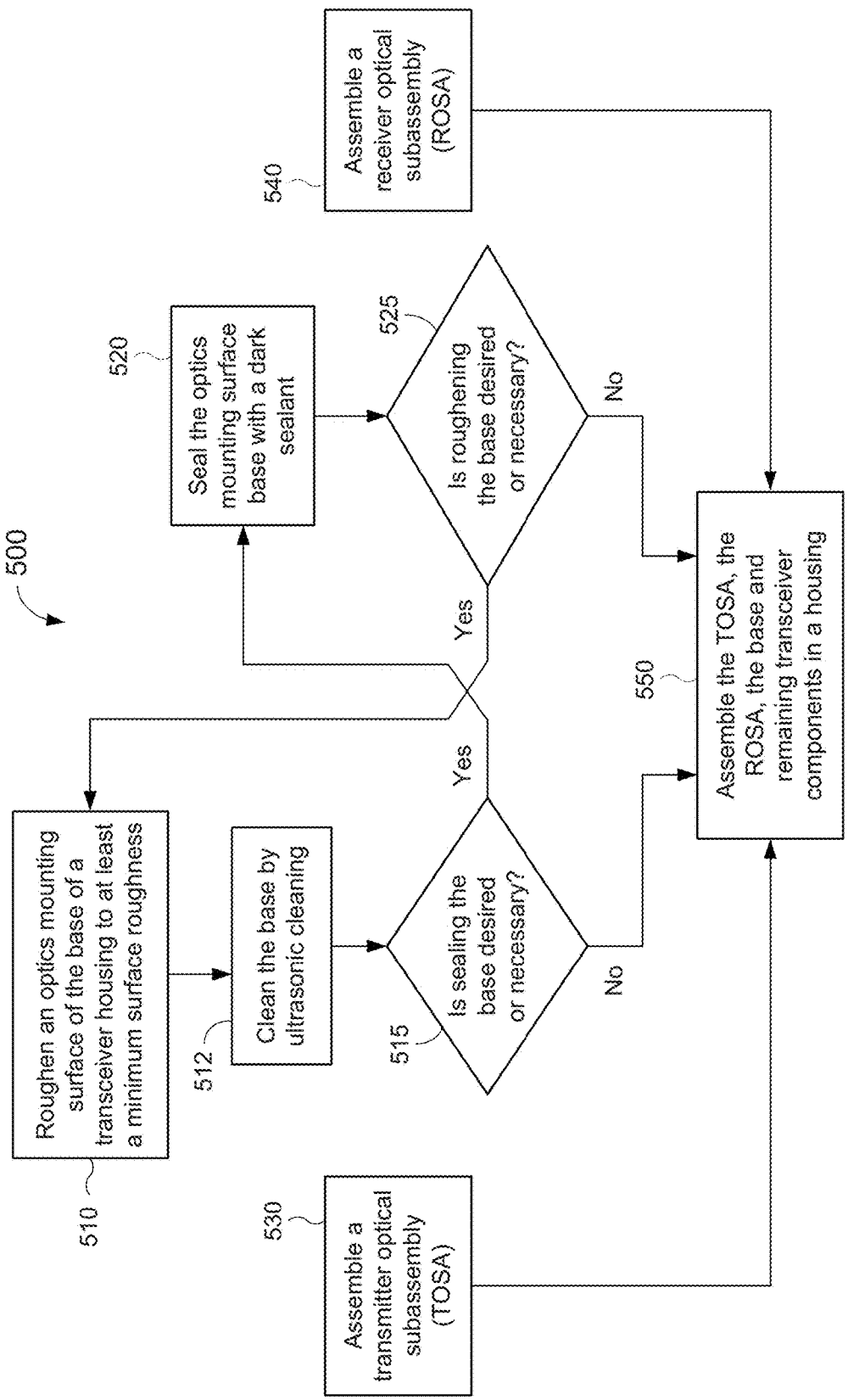

METHODS OF REDUCING OR ELIMINATING INTERNAL OPTICAL LIGHT REFLECTIONS, INCREASING YIELD, REDUCING HIGH-TEMPERATURE TRANSMISSION FAILURES AND/OR IMPROVING OSA TRANSMISSION PERFORMANCE AND AN IMPROVED OPTICAL TRANSCEIVER IMPLEMENTING THE SAME

FIELD OF THE INVENTION

The present invention relates to the field of optical transceivers, especially to optical transceivers that may have transmission failures at high temperatures (e.g., ≥85° C.), and methods of reducing such failures and increasing manufacturing yields of such optical transceivers.

DISCUSSION OF THE BACKGROUND

Optical or optoelectronic transmitter-receiver modules (optical transceivers for short) are utilized primarily to convert electrical information to optical information and optical information to electrical information, and to transmit and receive optical information over or from an optical fiber. Generally, optical transceivers include optoelectronic devices, electrical circuits and electrical and optical interfaces, and play an important role in optical fiber communication systems and optical networks.

Transceivers are often tested at the site of manufacturing for performance under various conditions (e.g., temperature, humidity, supply voltage, duration of operation, etc.). Automated testing equipment (ATE) may be used to test transceivers for faults. However, there may be faults that have causes that are not easy to identify or pin-point.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

One aspect of the invention relates to an optical transceiver, comprising a base or housing having a roughened and/or darkened optics mounting surface and first, second and third ports, a transmitter optical subassembly (TOSA) in the first port, a receiver optical subassembly (ROSA) in the second port, a beam splitter mount secured to or mounted on the roughened and/or darkened optics mounting surface, a beam splitter secured to or mounted on the beam splitter mount, and an optical fiber adapter in the third port. The TOSA includes a laser diode configured to convert a received electrical signal to an outgoing optical signal. The ROSA includes a photodiode configured to convert a received optical signal to an outgoing electrical signal. The beam splitter is transparent to one of the outgoing optical signal and the received optical signal and configured to reflect the other of the outgoing optical signal and the received optical signal. The optical fiber adapter is configured to hold an optical fiber that receives the outgoing optical signal from the laser diode and provides the received optical signal to the beam splitter.

When the base or housing of the optical transceiver comprises the roughened optics mounting surface, the roughened optics mounting surface may have an average roughness of at least 2 μm. When the base or housing comprises the darkened optics mounting surface, the darkened optics mounting surface may comprise a dark sealant, coating or adhesive on the optics mounting surface. The dark sealant, coating or adhesive may comprise a polymer resin or epoxy a dark or black pigment, or alternatively, a dark or opaque polymer resin or epoxy. The dark sealant, coating or adhesive may be configured to absorb light having a wavelength of 400-2000 nm and/or adhere the beam splitter mount to the optics mounting surface. In some embodiments, the optics mounting surface comprises a roughened and darkened optics mounting surface.

The optical transceiver may further comprise a first lens in the base or housing and adjacent to the TOSA. The first lens may be configured to focus and/or collimate the outgoing optical signal. In such embodiments, the optical transceiver may also further comprise (i) a lens holder configured to secure the first lens directly or indirectly to the TOSA and/or (ii) a transparent window configured to seal and protect the TOSA and the first lens.

Additionally or alternatively, the optical transceiver may further comprise (i) a second lens in the base or housing, configured to focus the received optical signal onto the photodiode, (ii) a first bandpass filter between the beam splitter and the photodiode, configured to block, absorb and/or reflect part(s) of the received optical signal having a wavelength above a first predetermined wavelength and below a second predetermined wavelength smaller than the first predetermined wavelength, and/or (iii) a second bandpass filter between the first lens and the beam splitter, configured to block, absorb and/or reflect part(s) of the outgoing optical signal having a wavelength above a third predetermined wavelength and below a fourth predetermined wavelength smaller than the third predetermined wavelength.

In further embodiments, the TOSA may further comprise a monitoring photodiode configured to receive part of an output of the laser diode and provide an analog signal characteristic of an output strength of the outgoing optical signal. In such embodiments, the optical transceiver may further comprise (i) an analog-to-digital converter (ADC) configured to convert the analog signal from the monitoring photodiode to a digital signal and (ii) a microcontroller or other logic circuit configured to receive the digital signal from the ADC and provide a feedback signal configured to control or adjust the output strength of the outgoing optical signal.

In still further embodiments, the laser diode may further comprise a modulator (e.g., the laser diode and modulator together may comprise an electromodulated laser [EML]), and the optical transceiver may further comprise a laser driver, configured to receive an electrical data signal from an external source (e.g., a host device) and provide a driving signal to the laser diode (or, when present, the modulator).

Another aspect of the present invention relates to a method of making an optical transceiver, comprising roughening and/or darkening an optics mounting surface of a base or housing comprising first, second and third ports, securing or adhering a beam splitter mount to the roughened and/or darkened optics mounting surface, securing or mounting a beam splitter on or to the beam splitter mount, placing a transmitter optical subassembly (TOSA) in the first port, placing a receiver optical subassembly (ROSA) in the second port, and placing an optical fiber adapter in the third port. As for the optical transceiver, the beam splitter is transparent to one of an outgoing optical signal and a received optical signal, and is configured to reflect the other of the outgoing optical signal and the received optical signal; the TOSA comprises a laser diode configured to convert a received electrical signal to the outgoing optical signal, the ROSA comprises a photodiode configured to convert the received optical signal to an outgoing electrical signal, and the optical fiber adapter holds and/or secures an optical fiber that receives the outgoing optical signal from the laser diode and provides the received optical signal to the beam splitter.

In the present method, the optics mounting surface may be roughened (e.g., by sand-blasting), darkened, or both roughened and darkened. In addition, a side surface of the transceiver a base or housing facing the TOSA may also be roughened and/or darkened. In one example, sand-blasting may comprise expelling a stream of abrasive material and compressed air toward the optics mounting surface. The optics mounting surface may be roughened to an average roughness of at least 2 pun. In another example, darkening the optics mounting surface may comprise applying a dark sealant, coating or adhesive on the optics mounting surface. When the optics mounting surface is darkened with the dark sealant, coating or adhesive, the method may further comprise curing the dark sealant, coating or adhesive at a temperature of 50-150° C. for a length of time of 3-300 minutes.

In further embodiments, the present method may further comprise securing or affixing a first lens to a lens holder and attaching or securing the lens holder directly or indirectly to the TOSA. The first lens may be configured to focus and/or collimate the outgoing optical signal. Additionally or alternatively, the present method may further comprise securing or affixing a second lens to the ROSA or the base or housing. The second lens may be configured to focus the received optical signal onto the photodiode.

In other or further embodiments, the present method may further comprise (i) placing a first bandpass filter between the beam splitter and the photodiode and/or (ii) placing a second bandpass filter between the first lens and the beam splitter. The first bandpass filter may be configured to block, absorb and/or reflect part(s) of the received optical signal having a wavelength above a first predetermined wavelength and below a second predetermined wavelength smaller than the first predetermined wavelength. The second bandpass filter may be configured to block, absorb and/or reflect part(s) of the outgoing optical signal having a wavelength above a third predetermined wavelength and below a fourth predetermined wavelength smaller than the third predetermined wavelength. In specific examples, placing the first bandpass filter (between the beam splitter and the photodiode) and placing the second bandpass filter (between the first lens and the beam splitter) may each independently comprise securing, affixing or mounting the respective first or second bandpass filter on or to the beam splitter mount.

In still further embodiments, the present method may further comprise affixing a monitoring photodiode in the TOSA such that the monitoring photodiode receives part of the output of the laser diode, and placing, securing or mounting (i) an analog-to-digital converter (ADC) and (ii) a microcontroller in the optical transceiver. The monitoring photodiode may provide an analog signal characteristic of an output strength of the outgoing optical signal. The ADC may be configured to convert the analog signal from the monitoring photodiode to a digital signal. The microcontroller may be configured to receive the digital signal from the ADC and provide a feedback signal that controls or adjusts the output strength of the outgoing optical signal.

The present optical transceiver and method advantageously reduce internal reflections in the optical transceiver and dramatically improve the manufacturing yield of such optical transceivers after testing at high temperature (e.g., ≥85° C.). These and other objects and advantages of the present invention will become apparent to those skilled in the art upon review of the following detailed description of various embodiments and/or the accompanying drawings.

BRIEF DESCRIPTION OF THE DRAWINGS

FIG. 4 shows a flowchart for a method of assembling an exemplary optical transceiver in accordance with one or more embodiments of the present invention.

DETAILED DESCRIPTION

Figure 1:
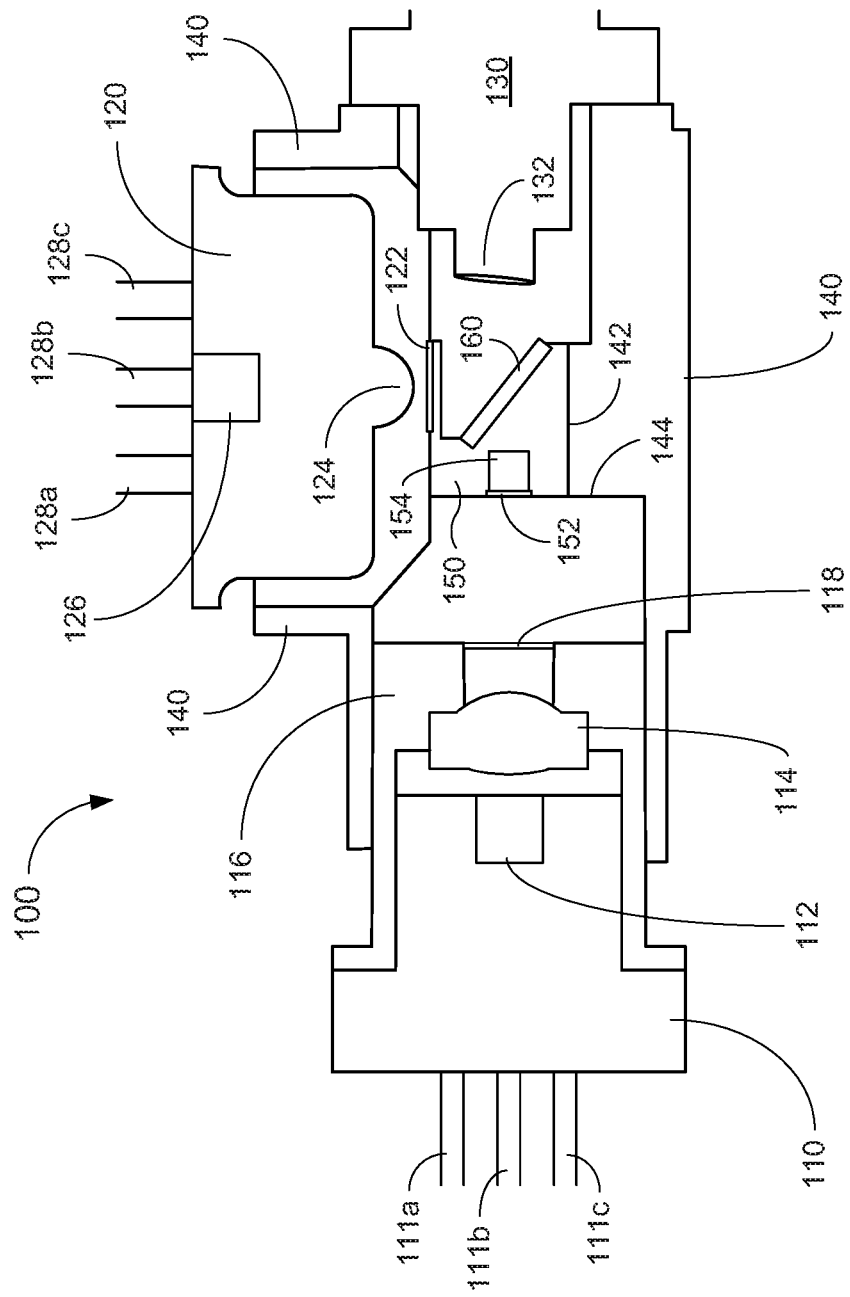
FIG. 1 shows an exemplary optical transceiver including a transmitter optical subassembly (TOSA) and a receiver optical subassembly (ROSA) in accordance with embodiments of the present invention.
Figure 2:
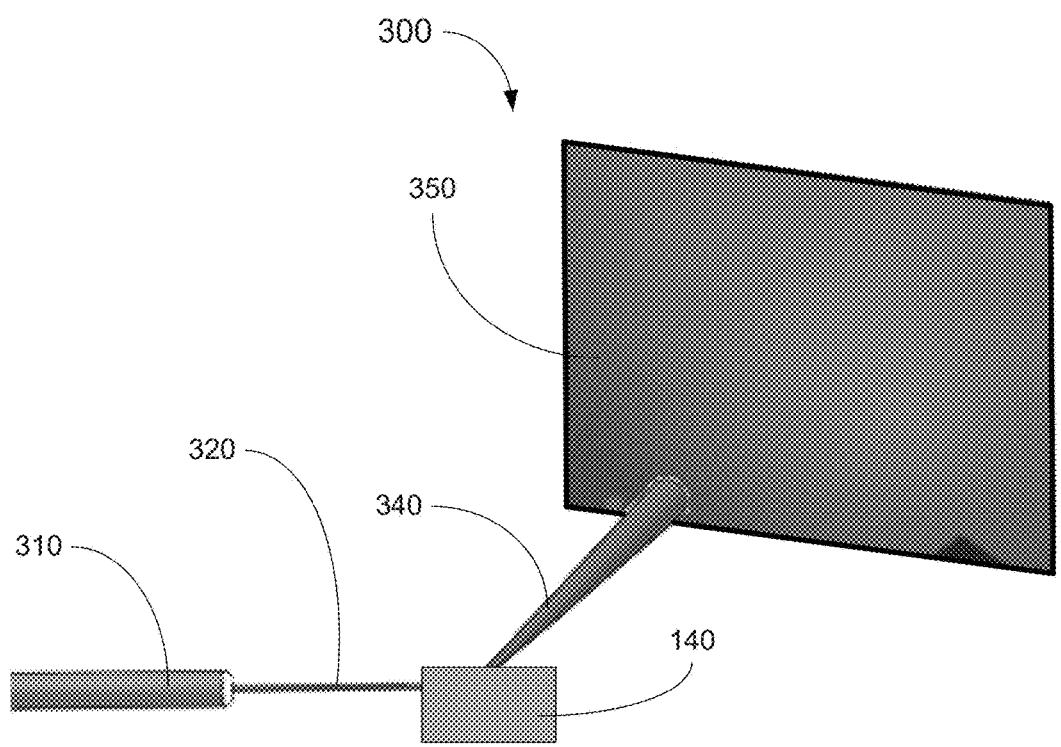
FIG. 2 shows an experimental apparatus for testing the reflectance of transceiver bases in accordance with experiments performed to determine solutions for high-temperature failures of exemplary optical transceivers in accordance with the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

In the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

In the present disclosure, a "major surface" of a structure or feature is a surface defined at least in part by the largest axis of the structure or feature (e.g., if the structure is round and has a radius greater than its thickness, the radial surface[s] is/are the major surface of the structure). In general, the length and width dimensions of a 3-dimensional object are the two largest dimensions of the object (the length being greater than the width when the two dimensions differ), and the thickness of the 3-dimensional object is the smallest dimension of the object, unless the context of the disclosure indicates otherwise.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

FIG. 1 shows an exemplary optical transceiver 100 comprising a transmitter optical subassembly (TOSA) 110 including leads 111a-c, a first cavity 112, a first lens 114, a lens holder 116 and a transparent window 118, a receiver optical subassembly (ROSA) 120 including a first bandpass filter 122, a second lens 124, a photodiode 126 and leads 128a-c, a fiber adapter 130, a fiber stub 132, a base 140 with an optics mounting surface 142 and a side surface 144, a beam splitter mount 150, a second bandpass filter 152, a second cavity 154, and a beam splitter 160. The optical transceiver 100 may comprise a small form-factor pluggable (SFP) transceiver, a small form-factor pluggable plus (SFP+) transceiver, a 10 Gigabit small form-factor pluggable (XFP) transceiver, a quad SFP pluggable (QSFP) transceiver, or a gigabit interface converter (GBIC) transceiver.

The TOSA 110 may comprise a laser diode (LD), a monitoring photodiode (MPD), and a housing or package. The housing or package may comprise a transistor outline (TO) package, but the invention is not so limited. The first cavity 112 includes one or more surfaces to which the LD and the MPD are affixed or secured. The LD is configured to convert an electrical signal (e.g., from a host device) to an outgoing optical signal, and transmit the optical signal to an optical network (e.g., using an optical fiber in the fiber adapter 130, optically connected to fiber stub 132). The LD may be a double heterostructure laser, a separate confinement heterostructure laser, a quantum well laser, a quantum cascade laser, an interband cascade laser, a distributed Bragg reflector laser, a distributed feedback laser, a vertical cavity laser, a vertical-cavity surface-emitting laser [VCSEL], a vertical-external-cavity surface-emitting laser [VECSEL], an external-cavity diode laser, or other device that converts an electrical current or signal into light, and may be modulated (e.g., an electromodulated laser [EML]) or unmodulated.

The TOSA 110 may further include a laser driver configured to receive an electrical data signal and send a data driving signal or pulse to a modulator optically coupled to the LD. The laser driver may receive the electrical data signal from a host device on one or more of the leads 111a-c. When the electrical data signal is single-ended, it is received on one of the leads 111a-c, and when the electrical data signal is differential, it is received on two of the leads 111a-c. A fourth lead (not shown) may be hidden by lead 111b. The LD may also receive a bias signal or voltage from a bias control circuit in the TOSA 110. The MPD may be electrically connected to a microcontroller in the TOSA 110 via an analog-to-digital converter (ADC) circuit or module. The microcontroller may receive a digital signal (e.g., a voltage) corresponding to the value of a feedback current from the MPD, and the digital signal may be compared to one or more thresholds or voltages representative of a target value and/or acceptable maximum and/or minimum values of the optical signal from the LD. The MPD, analog-to-digital converter, microcontroller and laser driver may form an automatic power control (APC) loop for maintaining the output power of the optical signal from the LD at the target value or within a predetermined range.

The first lens 114 is configured to focus the outgoing optical signal (which may be collimated) on the end of the fiber stub 132 or on a point in the fiber stub 132 near the end. The first lens 114 may comprise a ball lens with flat orthogonal sides, or alternatively, a ball lens without flat sides, a half-ball lens, an aspheric lens with one or more convex, planar and/or concave surfaces, or a combination thereof. Such lenses may have two or more flat sides that are parallel and/or orthogonal to each other (as shown) to increase accuracy and/or precision of the placement of the first lens 114 in the lens holder 116 and/or to increase the surface area for adhesion between the first lens 114 and the lens holder 116, but the invention is not limited to such lenses. In one embodiment, the outgoing optical signal is a diffuse beam, and the first lens 114 may partially or completely collimate the outgoing optical signal. The first lens 114 may be a separate unit, held in place by the lens holder 116. Alternatively, the first lens 114 may be unitary or integrated with the lens holder 116. The transparent window 118 is configured to seal the TOSA 110 and the first lens 114 within an external housing or cover such as the lens holder 116 (e.g., to prevent moisture from accumulating therein and/or to protect the first lens 114 and the TOSA 110 from physical damage). In some embodiments, the window 118 may comprise a bandpass filter configured to reduce or prevent optical damage to components in the TOSA 110.

The ROSA 120 may comprise a photodiode 126 configured to receive an incoming optical signal from an optical network (e.g., from an optical fiber in the fiber adapter 130, optically connected to fiber stub 132) and convert the optical signal to an electrical signal (e.g., to be transmitted to a host device over one or more of the leads 128a-c). A fourth lead (not shown) may be hidden by lead 128b. When the electrical signal is single-ended, it is transmitted on one of the leads 128a-c, and when the electrical signal is differential, it is received on two of the leads 128a-c.

The ROSA 120 may have a housing or package that comprises a TO package, but the invention is not so limited. The photodiode 126 may be a PN junction photodiode, a PIN junction photodiode, an avalanche photodiode, or any other device that converts an optical signal to an electrical signal. Optionally, the ROSA 120 may further include (i) a transimpedence amplifier (TIA) configured to amplify the converted electrical signal from the LD and (ii) a limiting amplifier configured to amplify the signal received from the TIA.

The second lens 124 may comprise a half-ball lens, a concave lens, a convex lens and/or a combination of concave and convex lenses, and is configured to focus the incoming optical signal toward the photodiode 126. The first bandpass filter 122 may block, absorb and/or reflect part(s) of an incoming optical signal having a wavelength above a first predetermined wavelength and below a second predetermined wavelength smaller than the first predetermined wavelength. The incoming optical signal may have a predetermined center wavelength (e.g., in the range of 1200-1700 nm, such as 1270 nm, 1310 nm, 1550 nm, 1577 nm, etc., or in the range of 800-2000 nm, such as 850 nm and the previously mentioned wavelengths). The bandpass filter 122 may have a major surface that is orthogonal to the optical signal reflected by the beam splitter 160.

The fiber adapter 130 is configured to hold an optical fiber (not shown) and the fiber stub 132, and is optically connected to the optical fiber. The end of the fiber stub 132 may have an angled surface (e.g., a planar surface at an angle that is not orthogonal to the outgoing optical signal). The fiber adapter 130 may be separate from the housing or the base 140 of the optical transceiver 100. Alternatively, the fiber adapter 130 may be integrated or unitary with the housing or the base 140 of the optical transceiver 100.

The housing or base 140 supports and/or secures various components of the transceiver 100 (e.g., the lens holder 116, the fiber adapter 130, the ROSA 120 and the beam splitter mount 150) and seals the inside of the transceiver 100 from the outside environment (e.g., to prevent moisture from accumulating therein and/or to block light from entering therein). The base 140 includes the optics mounting surface 142 that faces the interior of the transceiver 100 (e.g., toward the beam splitter 160). The base 140 may include the side surface 144 facing the TOSA 110. The base 140 may comprise an opaque plastic and/or a metal, such as aluminum.

The beam splitter mount 150 is transparent to the light emitted from the LD in the TOSA 110. As a result, the optics mounting surface 142 may disadvantageously reflect light back into the TOSA 110, which may result in failure to transmit light having the predetermined wavelength at high temperatures (e.g., greater than 80° C.). To decrease the reflectance of light back into the TOSA 110 and thus reduce or prevent this failure mechanism, the optics mounting surface 142 may be roughened (e.g., by sand-blasting, also known as abrasive blasting). For example, the optics mounting surface 142 may have an average roughness of from 2 μm to 500 μm or any value or range of values therein (e.g., 5-250 μm, 10-200 μm, etc.).

Additionally or alternatively, the optics mounting surface 142 may be sealed with a dark or opaque sealant, coating or adhesive. In various embodiments, the sealant absorbs all or substantially all (e.g., greater than 95%, greater than 98%, greater than 99%, or any other value greater than 95%) of the light in the range of 400-2000 nm or any range of values therein (e.g., 440-1600 nm). Additionally or alternatively, the sealant, coating or adhesive may have a thickness of 1-2000 μm, or any value or range of values therein. The sealant may comprise a polymer resin or epoxy, such as an acrylic or acrylate polymer, a latex, a styrene, a polyimide, an epoxy (polyether), a urethane, a polyester, a polyamide, or a mixture or blend thereof. The sealant may be inherently dark or opaque, or may further include a dark or black pigment in addition to the polymer. For example, the sealant may comprise a copolymer of styrene and dimethylaminopropylamine [DMAPA] maleimide (e.g., SMA® 4000i resin, commercially available from TOTAL Cray Valley, Paris, France) or an epoxy phenol novolac (e.g., EPO-TEK® 353-ND adhesive, commercially available from Epoxy Technology, Inc., Billerica, Mass.). Thus, the dark sealant, coating or adhesive may have multiple functions (e.g., to absorb light and the adhere the beam splitter mount 150 to the optics mounting surface 142 of the base 140). The dark sealant, coating or adhesive may be cured at a predetermined temperature (e.g., in the range of 50-150° C.) for a predetermined duration of time (e.g., 3-300 minutes). In various examples, an epoxy phenol novolac may be cured for 10 minutes at 110° C., and a styrene-DMAPA maleimide copolymer may be cured for 90 minutes at 90° C. Additionally, the base side surface 144 may be roughened (e.g., sand-blasted) and/or sealed with the dark sealant, coating or adhesive.

The beam splitter mount 150 provides a surface to secure the beam splitter 160, the first bandpass filter 122, and the second bandpass filter 152 each of which may be secured to the beam splitter mount 150 using an adhesive (which generally is transparent or substantially transparent). The beam splitter mount 150 may include one or more notches, depressions or other settings for each of the beam splitter 160, the first bandpass filter 122, and the second bandpass filter 152, configured to receive the beam splitter 160, the first bandpass filter 122, or the second bandpass filter 152, respectively. The beam splitter mount 150 generally comprises an optically transparent material such as a plastic (e.g., a polycarbonate, a polyalkene, a polyester, a polyether, a poly[meth]acrylate, or a copolymer or blend thereof) and may be affixed or secured to one or more surfaces of the housing or the base 140 (e.g., the optics mounting surface 142) by the dark sealant, coating or adhesive.

The beam splitter 160 may comprise a dichroic mirror or other wavelength-dependent light reflector and transmitter (e.g., a long wave pass [LWP] dichroic mirror, short wave pass [SWP] dichroic mirror, etc.). For example, the beam splitter 160 may reflect light having a wavelength at or above a predetermined wavelength (e.g., in the range of 800-1600 nm), but be transparent or substantially transparent to light below the predetermined wavelength, or vice versa. In alternative embodiments, the beam splitter 160 may comprise a wavelength selective filter (e.g., made of or coated with a material that reflects or is transparent to light having a certain wavelength or wavelength band), a polarization filter (e.g., configured to reflect light having a certain polarization and be transparent to light having a different polarization), an amplitude modulation mask, a phase modulation mask, a hologram or a grating.

The second bandpass filter 152 may be similar to the first bandpass filter 122, and may be configured to block, absorb and/or reflect part(s) of the outgoing optical signal having a wavelength above a third predetermined wavelength and below a fourth predetermined wavelength less than the third predetermined wavelength. The second cavity 154 provides a surface (e.g., a notch) onto which the second bandpass filter 152 can be mounted.

Potential Failure of the Transceiver 100 at High Temperatures

In the absence of roughening and/or darkening the optics mounting surface 142, the transceiver 100 may experience a transmission power failure at high temperatures (e.g., greater than 80° C.). For example, the power of the outgoing optical signal from the LD in the TOSA 110 may decrease below a predetermined minimum threshold, and may approach 0 mW. Prior to discovering the solution(s) to this failure mechanism, several experiments were performed to isolate the problem(s) that cause transmission power failure at high temperatures, and are described below.

Experiment 1

Ten transceivers (represented by the transceiver 100) that experienced transmission power failure at high temperature (e.g., 85° C.) at a first automatic testing equipment (ATE) station were retested at two different, randomly selected ATE stations to determine if (1) the transmission power failures were repeatable, and (2) the first ATE station malfunctioned. After retesting at the two randomly selected ATE stations, the ten transceivers were manually tested (e.g., with a multimeter). All of the ten transceivers still experienced transmission power failure, whether tested at the ATE stations or manually tested. Thus, the results suggest that the transmission power failures are caused by a defect in the transceivers 100, and not a malfunctioning ATE station.

Experiment 2

Applying a force to various sides of the transceiver 100 (e.g., by striking or hammering an outer surface of the base 140) may align the optical components more favorably (e.g., by aligning the laser diode and the optical fiber), and thus increase transmission power. Five transceivers (substantially similar to the transceiver 100) that experienced transmission power failure at high temperature were each (1) struck (e.g., with a hammer) on the TOSA port of the base or housing 140, then tested for transmission power at 85° C., (2) struck on the port for the optical fiber adapter 130, then tested for transmission power at 85° C., (3) checked to see if the transmission power increased (preferably by at least 20%) at room temperature, and, if so, (4) re-tested for transmission power at 85° C. Although the transmission power increased slightly for each of the five transceivers (e.g., at room temperature), the improvement was not significant, and all five transceivers still experienced transmission power failure at 85° C.

Experiment 3

Five transceivers (represented by the transceiver 100) that experienced transmission power failure at 85° C. were each tested using a spectrum analyzer at room temperature (e.g., 25° C.), and then again at 85° C. At room temperature, the transceiver output light primarily at 1550 nm. However, after increasing the testing temperature to 85° C., the peak at 1550 nm disappeared, while a second peak at 1610 nm increased in intensity. Since the pass band of the beam splitter 160 in the transceivers 100 is from 1530 nm to 1570 nm (and therefore excludes 1610 nm), the transmission power of the LD in the acceptable wavelength range (1530-1570 nm) is very low, and in some cases, is 0 mW.

Experiment 4

To determine in more detail how the optical spectrum changes in the units experiencing output power failure at high temperature, one transceiver (represented by the transceiver 100) that experienced output power failure at high temperature was tested using a spectrum analyzer at 25° C., 65° C. and 85° C. At 25° C., the spectrum analyzer showed a first peak at 1550 nm (i.e., within the acceptable range) and no discernable second peak. At 65° C., the spectrum analyzer showed the first peak at 1550 nm, but smaller than at 25° C., and a small second peak at 1610 nm. At 85° C., the first peak at 1550 nm was substantially gone, and the second peak at 1610 nm increased sharply. Thus, the optical spectrum (i.e., the wavelength[s] of the output light) of the transceiver 100 changed as the temperature increased.

Experiment 5

One hundred transceivers (represented by the transceiver 100) that experienced output power failure at high temperature were tested using a conventional light-current-voltage (LIV) test and a power test after sand-blasting the optics mounting surface 142 of the bases 140 using a conventional sand blaster (e.g., with quartz sand having an average particle size of 30-50 µm for 5-10 seconds using compressed air at a pressure of 0.5-1.0 MPa). The transceiver bases 140 were then ultrasonically cleaned in deionized water for 10-30 minutes, then in alcohol (e.g., isopropyl alcohol) for 5-15 minutes. After cleaning, the transceiver bases 140 were dried by heating at 50-100° C. for 5-15 minutes.

The power test determined whether the output power of the optical signal from the LD in the TOSA 110 at a predetermined wavelength (1550 nm) exceeded a predetermined threshold. Each of the one hundred transceivers passed the LIV and power tests at 25° C., 65° C., and 85° C. Sand-blasting roughens (and may darken) the optics mounting surface 142 of the base 140, allowing more light to be scattered or absorbed, and increasing the light reflection angle(s) to decrease the amount of light reflected back to the laser diode in the TOSA 110.

Experiment 6

Fifty transceivers (represented by the transceiver 100) had the optics mounting surface 142 of their bases 140 sealed with a dark polymer resin comprising a copolymer of styrene and dimethylaminopropylamine (DMAPA) maleimide (SMA® 4000i, commercially available from TOTAL Cray Valley) and were tested using the same LIV and power tests as in Experiment 5. Fifty transceivers (identical to the 50 transceivers sealed with SMA® 4000i) had the optics mounting surface 142 of their bases 140 sealed with a resin comprising an epoxy phenol novolac (e.g., EPO-TEK® 353-ND, commercially available from Epoxy Technology, Inc.) and were tested at 85° C. using the same LIV and power tests as in Experiment 5. All one hundred transceivers output light in the acceptable wavelength range at an acceptable power, and therefore passed both the LIV and power tests.

Experiment 7

Fifty transceivers (represented by the transceiver 100), all of which failed either the LIV test and/or the power test at high temperature (e.g., 85° C.), had their ROSAs 120 and optical fiber adapters 130 removed. The optics mounting surface 142 of the base 140 of each transceiver was then sealed with the EPO-TEK® 353-ND resin, the ROSAs 120 and optical fiber adapters 130 were realigned, and the transceivers were tested using the same LIV and power tests as in Experiments 5 and 6. The beam splitters 160 of four of the transceivers were broken during the sealing/re-alignment processes. The other forty-six transceivers passed both the LIV and power tests at 85° C. Thus, sealing the transceivers with a dark sealant may repair and/or recover high-temperature functionality in transceivers that fail high-temperature ATE testing.

Experiment 8

FIG. shows an experimental set-up 300 comprising a laser pointer 310 configured to irradiate a transceiver base 140 with a laser beam 320, forming a reflected laser beam 340 that impinges onto a flat surface 350. For example, the flat surface 350 can be a black board, a white board, a wall, etc., having a relatively smooth surface and/or finish. The transceiver base 140 is placed at a distance of about 15 cm from the flat surface 350.

Four transceiver bases 140 were tested using the experimental set-up 300. A first transceiver base was manufactured without roughening or sealing with a dark sealant. A second transceiver base was sealed with epoxy phenol novolac (EPO-TEK® 353-ND) and cured for 10 minutes at 110° C. A third transceiver base had its optics mounting surface 142 sand-blasted (e.g., to roughen the surface, allowing it to reflect less light) in a manner identical or substantially identical to Experiment 5. A fourth transceiver base was sealed with a styrene-DMAPA maleimide copolymer (SMA® 4000i) and cured for 90 minutes at 90° C. The results of the testing are shown in FIGS. 4A-D.

Figure 3A:
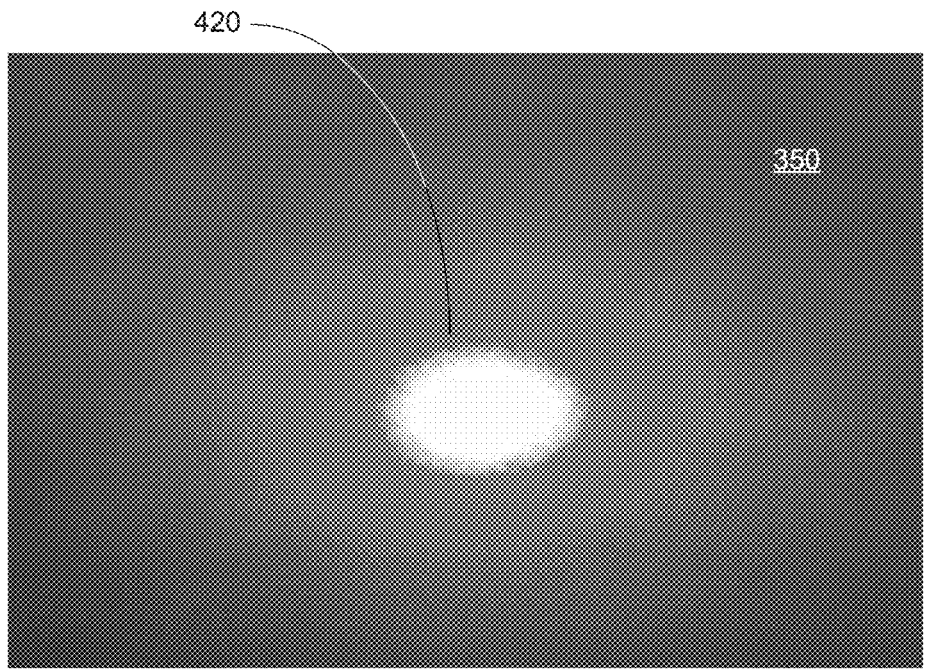
FIGS. 3A-D show the results of testing the reflectance of various transceiver bases using the apparatus of FIG. 2.

FIG. 3A shows the result of irradiating the first transceiver base (e.g., the one that was processed without roughening or sealing) with the laser pointer 310. The reflected laser beam 340 forms a reflection 420 on the flat surface 350. The reflection 420 is relatively bright, with a minimum diameter of about 5 cm and a maximum diameter of about 8 cm.

Figure 3B:
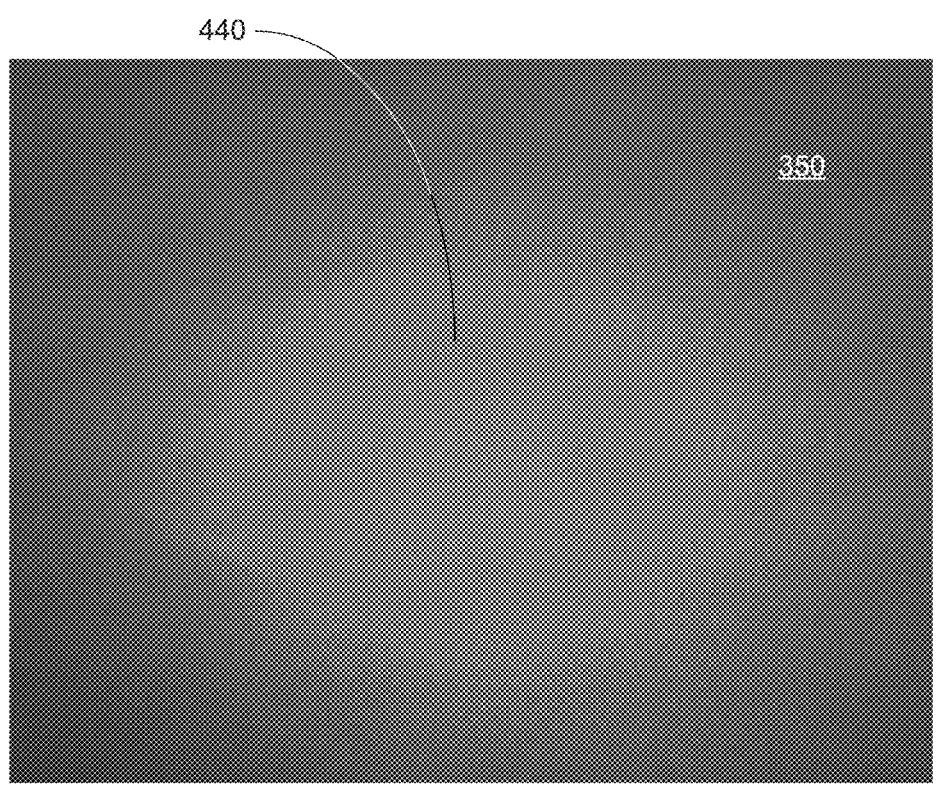

FIG. 3B shows the result of irradiating the second transceiver base (i.e., the one that was sealed with the epoxy phenol novolac adhesive) with the laser pointer 310. The reflected laser beam 340 forms a reflection 440 on the flat surface 350. The reflection 440 is relatively bright but with noticeably less intensity than the reflection 420. The reflection 440 in FIG. 3B is also more scattered than the reflection 420 of FIG. 3A, with a minimum diameter of about 10 cm and with a maximum diameter of about 15 cm.

Figure 3C:
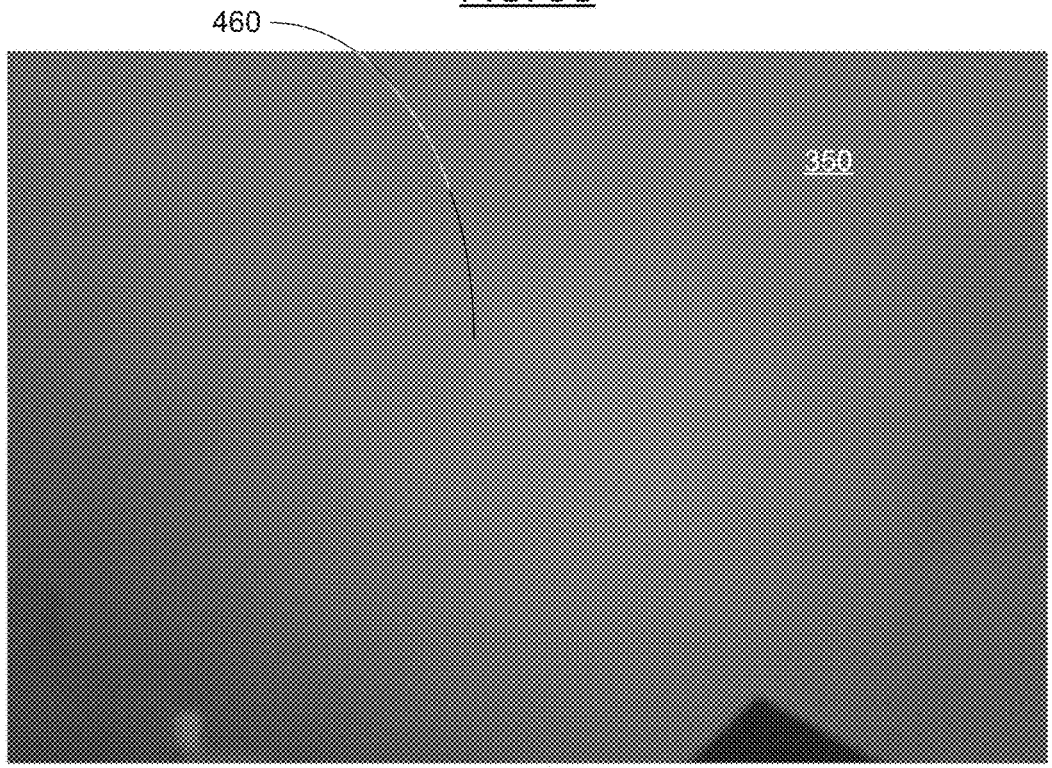

FIG. 3C shows the result of irradiating the third transceiver base (e.g., the one that was sand-blasted) with the laser pointer 310. The reflected laser beam 340 forms a reflection 460 on the flat surface 350. The reflection 460 is relatively faint, and noticeably less intense and more scattered than the reflection 440 of FIG. 3B, with a minimum diameter of over 20 cm.

Figure 3D:
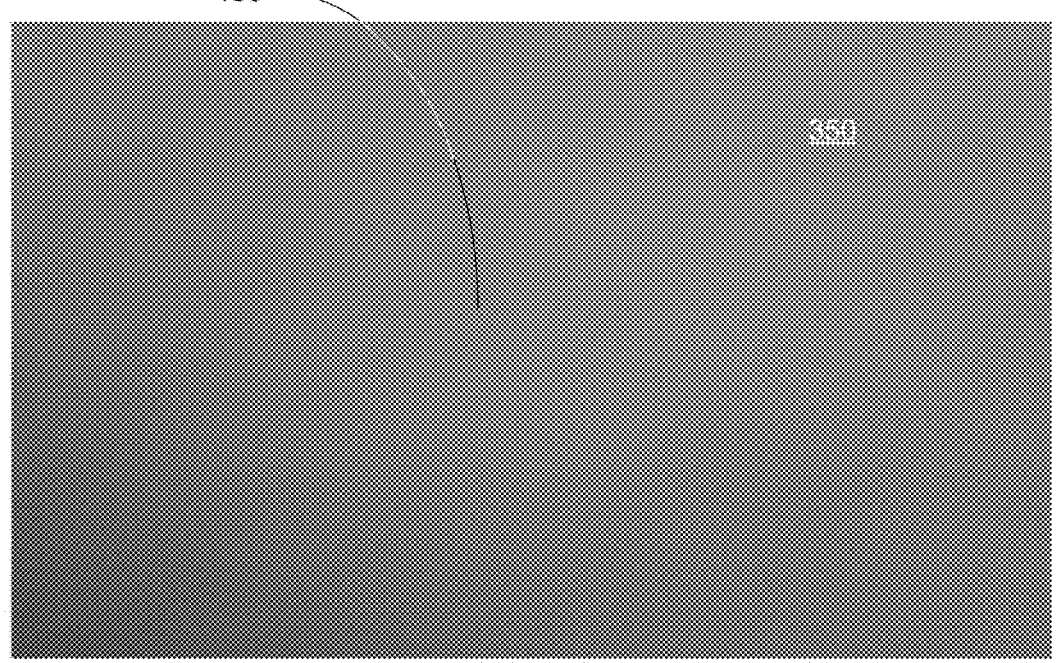

FIG. 3D shows the result of irradiating the fourth transceiver base (e.g., the one that was sealed with styrene-DMAPA maleimide copolymer) with the laser pointer 310. The reflected laser beam 340 forms a reflection 480 on the flat surface 350. The reflection 480 is relatively faint and almost completely absent compared to the reflections 420, 440 and 460 of FIGS. 3A-C. The diameter of the reflection 480 could not be reliably measured.

Thus, Experiments 1-8 suggest that sealing the optics mounting surface 142 of the transceiver base 140 with a dark polymer resin and/or roughening the optics mounting surface 142 of the transceiver base 140 advantageously reduces the failure rate of the transceiver at high temperature (e.g., greater than 80° C.). Indeed, the failure rate was decreased from about 20-30% to less than 3% after roughening and sealing (e.g., tested using ATE).

An Exemplary Method of Manufacturing an Optical Transceiver to Reduce Reflections and/or Output Power Failure at High Temperatures FIG. 4 is a flow chart 500 showing an exemplary method of manufacturing an optical transceiver including a TOSA, a ROSA, and a transceiver base and/or housing.

At 510, a transceiver base is roughened to at least a minimum surface roughness. In one example, the optics mounting surface of the transceiver base is roughened using a conventional sand-blasting apparatus. Alternatively, the transceiver base may be roughened by sanding (using a conventional belt or rotary sander equipped with sandpaper having an average grit size of from 10-500 µm or any value or range of values therein, such as 20-100 µm), rubbing against an abrasive surface, etc.

Sand blasting is also known as abrasive blasting. The sand-blasting apparatus may comprise a blast pot configured to hold and/or supply the abrasive material, a tank containing a pressurized gas or a compressor configured to supply the pressurized gas (e.g., compressed air, deoxygenated air, nitrogen, etc.), a tube or chamber for mixing the abrasive material and the pressurized gas (e.g., a Venturi tube), and a nozzle for ejecting a stream of the abrasive material and the pressurized gas toward the transceiver base. The gas may be at a pressure of 0.2-10 MPa or any value or range of values therein (e.g., 0.4-2 MPa). Alternatively, the stream may be ejected at a velocity of from 100-2000 m/s, or at any velocity or range of velocities therein. The compressor may comprise a diesel, gas, gasoline, or electric air compressor, which may be configured to provide pressurized gas to the blast pot or to the tube or chamber. The blast pot may be pressurized, and may include a mechanism configured to provide or inject an adjustable amount of abrasive material into the chamber. In one embodiment, the sand-blasting apparatus may comprise a blast cabinet including a closed loop system configured to recycle the abrasive material when sand-blasting the transceiver base. The nozzle may comprise a metal, a plastic, or a ceramic, such as tungsten carbide, silicon carbide, or boron carbide. The abrasive material may comprise silica (e.g., silica sand, quartz sand, garnet powder, etc.), sodium bicarbonate (e.g., baking soda), sodium chloride particles, kieserite, copper slag, nickel slag, coal slag, aluminum oxide, silicon carbide, glass beads, ceramic shot/grit, or plastic beads. The abrasive material may have an average particle or grit size, or any size or range of sizes therein. The optics mounting surface and optionally a side surface of the transceiver base may be sand-blasted for a duration of from 1 second to 5 minutes, or any value or range of values therein (e.g., 3-30 seconds). The nozzle may be oriented at an angle of 30-90° relative to the optics mounting surface and (if roughened) the side surface.

At 512, the transceiver base is cleaned. In one embodiment, the transceiver base is cleaned by ultrasonic cleaning. For example, the transceiver base may be cleaned in a conventional ultrasonic cleaning bath containing a solvent (e.g., deionized water, methanol. ethanol, isopropyl alcohol, acetone, mixtures thereof, etc.) for 1-60 minutes, or any length of time or range of lengths of time therein. In one example, the transceiver base is first cleaned ultrasonically in deionized water for 5-30 minutes (e.g., to remove water-soluble or water-miscible contaminants), then in an organic solvent for 1-20 minutes (e.g., to remove organic contaminants, and optionally, remaining water). In some embodiments, the organic solvent has a boiling point of less than 100° C. (e.g., ≤80° C.) and a solubility in water of at least 0.25 g/ml (e.g., is water-soluble or water-miscible). Alternatively, the transceiver base is cleaned by spraying with deionized water and drying (optionally by spraying the transceiver base with or immersing the transceiver base in a water-miscible, low-boiling point organic solvent such as acetone or isopropyl alcohol). After cleaning, the transceiver base is dried (e.g., by exposing to air or placing in a vacuum, by passing air over the transceiver base, by heating, a combination thereof, etc.). For example, the transceiver base may be dried by heating in an oven at 50-150° C. for at least 1 minute (e.g., 3-30 minutes, or any length of time or range of lengths of time >1 minute).

When the transceiver base is cleaned by ultrasonic cleaning, the ultrasonic cleaning apparatus may comprise a transducer (for generating ultrasonic waves at a frequency from 20-400 kHz), a cleaning solvent (e.g., water) in which the transceiver base is immersed, and a cleaning chamber configured to hold the cleaning solvent and the transceiver base. The transducer may be piezoelectric (e.g., made with lead zirconate titanate [PZT], barium titanate, etc.) or magnetostrictive. The ultrasonic waves agitate the cleaning solvent, producing strong forces on contaminants adhering to the transceiver base (e.g., the abrasive material from sandblasting, dust from the transceiver base after roughening, etc.), and may penetrate holes, cracks, or recesses that are otherwise difficult to clean. The cleaning solvent may include a surfactant configured to dislodge abrasive material and/or loose particulate matter from the surface of the transceiver base. Thus, all traces of contamination tightly adhering to and/or embedded on the transceiver base may be thoroughly and/or substantially completely removed.

At 515, if sealing the transceiver base with a dark sealant, coating or adhesive is desired (e.g., the transceiver base is not already sealed), the method continues at step 520. If sealing the transceiver base with a dark sealant, coating or adhesive is not desired (e.g., the transceiver base is already sealed, or the manufacturing process for the transceivers has an acceptable yield after high-temperature testing without sealing), the method continues at 550.

At 520, at least the optics mounting surface of the transceiver base is sealed with a dark or opaque sealant, coating or adhesive, as described herein. Optionally, the side surface of the transceiver base facing the TOSA is also sealed with the dark or opaque sealant, coating or adhesive. The invention is not limited to dark sealants or adhesives, and may include any polymer that absorbs light or reduces reflections. In addition, the transceiver base may be sealed prior to or without roughening the surface (e.g., the optics mounting surface) of the transceiver base.

The sealant may comprise a polymer and a dark pigment, or an inherently dark polymer, in an appropriate solvent. The dark sealant, coating or adhesive may be applied by spray-coating, brush-coating, etc., the optics mounting surface and optionally, the TOSA-facing side surface of the transceiver base with the dark or opaque sealant, coating or adhesive in the solvent, and drying the sealant, coating or adhesive (e.g., by removing the solvent, optionally using vacuum and/or heat). Alternatively, the inner surfaces of the transceiver base may be coated or sealed by immersion-coating or extrusion-coating.

The dark sealant, coating or adhesive may be subsequently cured in an oven or heating apparatus at a predetermined temperature for a predetermined duration of time. For example, the dark sealant, coating or adhesive may be cured at a temperature in the range of 50-150° C. for a length of time of from 3-300 minutes. Alternatively, the dark sealant, coating or adhesive may be cured using radiation (e.g., ultraviolet radiation), an electron beam, or one or more chemical additives.

At 525, if roughening the transceiver base is desired (e.g., the transceiver base is not already sand-blasted), the method continues at step 510. On the other hand, if roughening the transceiver base is not desired (e.g., the transceiver base already has a surface with sufficient roughness, or the manufacturing process for the transceivers has an acceptable yield after high-temperature testing without roughening), the method continues at 550.

At 530, a transmitter optical subassembly (TOSA) is conventionally assembled. The TOSA may include at least a laser diode (LD), a monitoring photodiode (MPD), a plurality of electrical leads, a lens, a lens holder, a transparent window, and a housing or package configured to secure and protect the LD, the MPD, the lens and the lens holder therein.

At 540, a receiver optical subassembly (ROSA) is conventionally assembled. The ROSA may include at least a photodiode, electrical leads, a lens, and a housing or package. In some embodiments, the ROSA may further include a bandpass filter. Optionally, the ROSA 120 further includes (i) a transimpedence amplifier (TIA) configured to amplify the electrical signal from the photodiode and (ii) a limiting amplifier configured to amplify the signal received from the TIA. The ROSA housing or package is configured to secure and protect the photodiode and the TIA and limiting amplifier (when present) therein.

At 550, the TOSA, the ROSA, the transceiver base (that has been sealed and/or roughened), and other components are assembled together to form the transceiver. The other components may include a beam splitter mount, a beam splitter, and one or more bandpass filters. In one embodiment, the beam splitter mount is secured to the roughened and/or sealed optics mounting surface of the base, and the beam splitter and bandpass filter(s) are secured to the beam splitter mount. Alternatively, these steps can be reversed. Thereafter, the TOSA and ROSA are placed (e.g., inserted) in their respective ports in the transceiver base, the optical fiber adapter/connector with the optical fiber and fiber stub therein is placed (e.g., inserted) into its port in the transceiver base, the TOSA and ROSA are aligned with the fiber or fiber stub, and the TOSA, the ROSA and the optical fiber adapter/connector are secured in place (e.g., with a UV-curable adhesive) when a threshold or maximum optical power is achieved (e.g., for both the transmitter [LD] and receiver [photodiode]).

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transceiver, comprising:
   a base or housing comprising a roughened and/or darkened optics mounting surface and first, second and third ports;
   a transmitter optical subassembly (TOSA) in the first port, the TOSA comprising a laser diode configured to convert a received electrical signal to an outgoing optical signal;
   a receiver optical subassembly (ROSA) in the second port, the ROSA comprising a photodiode configured to convert a received optical signal to an outgoing electrical signal;

a beam splitter mount secured to or mounted on the roughened and/or darkened optics mounting surface;

a beam splitter secured to or mounted on the beam splitter mount, the beam splitter being transparent to one of the outgoing optical signal and the received optical signal and configured to reflect the other of the outgoing optical signal and the received optical signal, wherein the optics mounting surface (i) is not coplanar with or parallel to the beam splitter and (ii) does not intersect the outgoing optical signal, the received optical signal, or the reflected other one of the outgoing optical signal and the received optical signal; and an optical fiber adapter in the third port, configured to hold an optical fiber that receives the outgoing optical signal from the laser diode and provides the received optical signal to the beam splitter.

2. The optical transceiver of claim 1, wherein the base or housing comprises the roughened optics mounting surface.

3. The optical transceiver of claim 1, wherein the base or housing comprises the darkened optics mounting surface.

4. The optical transceiver of claim 1, further comprising a first lens in the base or housing and adjacent to the TOSA, the first lens being configured to focus and/or collimate the outgoing optical signal, and a second lens in the base or housing, configured to focus the received optical signal onto the photodiode.

5. The optical transceiver of claim 1, further comprising (i) a first bandpass filter between the beam splitter and the photodiode, configured to block, absorb and/or reflect part(s) of the received optical signal having a wavelength above a first predetermined wavelength and below a second predetermined wavelength smaller than the first predetermined wavelength, and/or (ii) a second bandpass filter between the first lens and the beam splitter, configured to block, absorb and/or reflect part(s) of the outgoing optical signal having a wavelength above a third predetermined wavelength and below a fourth predetermined wavelength smaller than the third predetermined wavelength.

6. The optical transceiver of claim 1, wherein the TOSA further comprises a monitoring photodiode configured to receive part of an output of the laser diode and provide an analog signal characteristic of an output strength of the outgoing optical signal, and the optical transceiver further comprises (i) an analog-to-digital converter (ADC) configured to convert the analog signal from the monitoring photodiode to a digital signal and (ii) a microcontroller configured to receive the digital signal from the ADC and provide a feedback signal configured to control or adjust the output strength of the outgoing optical signal.

7. The optical transceiver of claim 2, wherein the roughened optics mounting surface has an average roughness of at least 2 μm.

8. The optical transceiver of claim 2, wherein the optics mounting surface comprises a roughened and darkened optics mounting surface.

9. The optical transceiver of claim 3, wherein the darkened optics mounting surface comprises a dark sealant, coating or adhesive on the optics mounting surface.

10. The optical transceiver of claim 4, further comprising (i) a lens holder configured to secure the first lens directly or indirectly to the TOSA and (ii) a transparent window configured to seal and protect the TOSA and the first lens.

11. The optical transceiver of claim 9, wherein the dark sealant, coating or adhesive comprises a polymer resin or epoxy a dark or black pigment.

12. The optical transceiver of claim 9, wherein the dark sealant, coating or adhesive comprises a dark or opaque polymer resin or epoxy.

13. The optical transceiver of claim 9, wherein the dark sealant, coating or adhesive is configured to absorb light having a wavelength of 400-2000 nm and adhere the beam splitter mount to the optics mounting surface.

14. A method of making an optical transceiver, comprising roughening and/or darkening an optics mounting surface of a base or housing comprising first, second and third ports;

securing or adhering a beam splitter mount to the roughened and/or darkened optics mounting surface;

securing or mounting a beam splitter on or to the beam splitter mount, the beam splitter being transparent to one of an outgoing optical signal and a received optical signal and configured to reflect the other of the outgoing optical signal and the received optical signal, wherein the optics mounting surface (i) is not coplanar with or parallel to the beam splitter and (ii) does not intersect the outgoing optical signal, the received optical signal, or the reflected other one of the outgoing optical signal and the received optical signal;

placing a transmitter optical subassembly (TOSA) in the first port, the TOSA comprising a laser diode configured to convert a received electrical signal to the outgoing optical signal;

placing a receiver optical subassembly (ROSA) in the second port, the ROSA comprising a photodiode configured to convert the received optical signal to an outgoing electrical signal; and placing an optical fiber adapter in the third port, the optical fiber adapter holding and/or securing an optical fiber that receives the outgoing optical signal from the laser diode and provides the received optical signal to the beam splitter.

15. The method of claim 14, wherein the optics mounting surface is roughened to an average roughness of at least 2 μm.

16. The method of claim 14, wherein the optics mounting surface is darkened.

17. The method of claim 15, wherein roughening the optics mounting surface comprises sand-blasting the optics mounting surface.

18. The method of claim 15, wherein the optics mounting surface is also darkened.

19. The method of claim 16, wherein darkening the optics mounting surface comprises applying a dark sealant, coating or adhesive on the optics mounting surface.

20. The method of claim 19, further comprising curing the dark sealant, coating or adhesive at a temperature of 50-150° C. for a length of time of 3-300 minutes.

* * * * *